United States Patent Office 2,752,317
Patented June 26, 1956

2,752,317

CHLOROSULFONATED HYDROCARBON POLYMER COMPOSITIONS CONTAINING ANTIGELLING AGENTS

Ralph H. Sudekum, Wilmington, Del., assignor to E. I. du Pont de Nemours and Company, Wilmington, Del., a corporation of Delaware No Drawing. Application February 24, 1953, Serial No. 338,611

5 Claims. (Cl. 260—29.1)

This invention relates to coating compositions and to processes for their preparation and more particularly to paints, lacquers, enamels, varnishes and adhesives which contain halosulfonated hydrocarbon polymers.

The halosulfonated hydrocarbon polymers used in the coating compositions of this invention may be produced by any suitable process, such as that disclosed in the McQueen U. S. Patent 2,212,786, issued August 27, 1940. By the process of the patent olefin polymers, such as the solid ethylene polymers, are chorosulfonated by a reaction with chlorine or other halogen and sulfur dioxide. It is known that these halosulfonated hydrocarbon polymers can be vulcanized or cured (hereinafter this process will be referred to as curing) by treating the polymer with a so-called cross-linking agent preferably in the presence of compounding agents. Suitable curing recipes are disclosed in the issued U. S. patents of McAlevy et al., 2,416,060 and 2,416,061, issued February 18, 1947. Prior to curing, the halosulfonated hydrocarbon polymers have many valuable properties. After curing, their physical and chemical resistances are enhanced appreciably. Toughness, abrasion resistance, ozone resistance and resistance to many chemicals are greatly improved by such treatment.

Inasmuch as one of the fundamentally important properites of a coating composition, cement and the like, is its resistance to physical or chemical attack, the preparation of such compositions, based on halosulfonated hydrocarbon polymers, demands for optimum utility that the coatings therefrom should contain the cured rather than the uncured polymer. The cured halosulfonated hydrocarbon polymers, however, are not soluble in any organic or inorganic solvent.

This invention relates to coating compositions, cements and analogous products, processes for their preparation and to compositions containing uncured halosulfonated hydrocarbon polymers which, nevertheless, can be applied to surfaces to take advantage of the exceptional properties of the cured halosulfonated hydrocarbon polymers.

An object of the present invention is to provide coating compositions containing as their base halsosulfonated hydrocarbon polymers. Another object of the invention is to provide paints, varnishes, enamels, lacquers, adhesives, glues and the like containing the chlorosulfonated normally solid polymers of ethylene. A further object is to provide stable coating compositions containing uncured halosulfonated hydrocarbon polymers. Yet another object is to provide stable coating compositions in which the gelling of the halosulfonated hydrocarbon polymer is inhibited during storage, and upon application as a coating the polymer in the uncured state is converted to the cured state. A further object of the invention is to provide adjuvants for use in such coating compositions. Other objects and advantages of the invention will hereinafter appear.

In accord with one feature of the invention, a coating composition is prepared by forming a solution of uncured halosulfonated hydrocarbon polymer in a suitable solvent, dispersing gelling inhibitors of the uncured substituted polymer with compounding agents and thereafter forming a homogeneous mixture of the solution and the dispersion. The coating compositions thus prepared can be stored prior to use for extended periods of time without gelation of the substituted polymer. When the coating composition is spread out as a film the solvent present evaporates, the effectiveness of the gelling inhibitor is lost and the substituted hydrocarbon polymer in the film then reacts chemically with the curing agents present to form a cured polymer. The order of mixing the solvent, gelling inhibitor, curing and compounding agents with the halosulfonated hydrocarbon polymer is not material although care should be exercised that this addition be made in such a manner that there is no appreciable gelling of the polymer during the preparation of the composition.

Alternatively, compositions effective for use in paints, cements and the like can be prepared by forming a dispersion of the halosulfonated hydrocarbon polymer, a gelling inhibitor being also present. This dispersion may contain curing and other compounding agents prepared much in the same manner as the solution described above. By means of a dispersion it is possible to apply a thicker and heavier coating or film of the polymer in one application with a considerable saving in time and labor. A preferred dispersion is formed in a non-solvent for the polymer which, however, is capable of swelling the polymer. It has been found that films laid down from a dispersion made in such a continuous phase deposit larger amounts of the polymer than are deposited in films from solutions of the polymer or from dispersion in non-solvents for the polymer that do not swell the polymer. Suitable liquids for the continuous phase of such dispersions in which the polymers are swollen include methyl ethyl ketone, dioxane and diisobutyl ketone. The vehicle for extending the halosulfonated hydrocarbon polymer, an aliphatic hydrocarbon mixture such as VM & P naphtha or mineral spirits, is selected principally to facilitate the method of applying the film as a coating composition by brush or spreading device, as a cementing layer, by doctoring knife or extrusion device and as applied for any desired use.

The examples which follow illustrate embodiments of the invention in which parts are by weight unless otherwise indicated.

TABLE I

*Paints*

| | Ex. 1 | Ex. 2 | Ex. 3 | Ex. 4 | Ex. 5 | Ex. 6 | Ex. 7 | Ex. 8 | Ex. 9 [1] |
|---|---|---|---|---|---|---|---|---|---|
| Chlorosulfonated polyethylene | 100 | 100 | 100 | 100 | 100 | 100 | 100 | 100 | 100 |
| Tribasic lead maleate | 20 | | 20 | 20 | 20 | | 40 | | |
| Hydrogenated wood rosin | 12 | | 5 | 5 | 2.5 | 10 | 5 | 2.5 | 5 |
| Mercaptobenzothiazole | 1 | | 2 | 2 | 1 | 2 | 2 | 2 | 1 |
| Calcium carbonate, sulfonated | | 75 | | | | | | | |
| Calcium carbonate, precipitated | | | | | | | | 60 | |
| TiO$_2$ | 75 | 25 | 50 | 25 | | 10 | | 30 | |
| Mineral spirits | | 100 | 50 | 50 | | | | | |
| Isopropanol | | | | | | 100 | 75 | 50 | |
| n-Butanol | | 50 | 100 | 100 | | | | | |
| Adipic acid | | | 2 | 2 | 2 | | 2 | 2 | 1.3 |
| Naphtha | | | | | | | | 100 | 165 |
| Antimony trioxide | | | | 10 | | | | | |
| Toluene | 400 | 400 | 400 | 400 | 400 | 400 | 400 | 400 | 330 |
| Aluminum powder | | | | | 50 | | 25 | | |
| MgO | | | | | | | | 20 | |
| Carbon black | | | | | | 2 | | | 20 |
| Phthalic anhydride | | | | | | | 50 | | |
| Xylene | | | | | | | | 25 | |
| Methanol | | | | | | | | 75 | |
| Methyl ethyl ketone | | | | | | | | | 66 |
| Methallyl alcohol | | | | | | | | | 30 |
| Litharge | | | | | | | 25 | | |
| Percent solids | 27.0 | 26.7 | 24.5 | 23.0 | 25.9 | 24.0 | 25.8 | 26.5 | 21.9 |

[1] Solids were mixed on a rubber mill and then dissolved in toluene.

White paint based on a recipe similar to that shown in Table I, Example 1, was stored at room temperature in a sealed container. After 14 days it had developed into an irreversible gel. A paint based on the recipe shown in Table I, Example 3, containing n-butanol and adipic acid, stored at room temperature in a manner similar to Example 1, did not gel after 1 year.

The dispersions of Table II are made up with and without anti-gelling agents. Those of Examples 1 to 6 may be mixed with dispersions of compounding and curing agents without anti-gelling agents and used immediately or the latter may contain such agents to provide long shelf-life. Examples 7 and 8 illustrate dispersions of chlorosulfonated polyethylene with anti-gelling agents for use especially with dispersions of curing and compounding agents that contain no anti-gelling agents.

TABLE II

*Dispersions of chlorosulfonated polyethylene [2]*

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Chlorosulfonated polyethylene | 100 | 100 | 100 | 100 | 100 | 100 | 100 | 100 |
| Dioxane [1] | 70 | 90 | 60 | | | | | |
| Methyl ethyl ketone [1] | | | | 60 | 50 | 50 | 60.0 | 60 |
| VM & P naphtha | 200 | 200 | | 240 | 117 | 100 | 76.0 | 49.3 |
| Mineral spirits | | | 200 | | | | | |
| Butyl alcohol | | | | | | | 50 | 50 |
| Adipic acid | | | | | | | 2 | 2 |
| Percent solids | 27.0 | 25.7 | 27.7 | 25.0 | 37.5 | 40.0 | 35.4 | 39.1 |

[1] Swelling agents.
[2] Made in a high speed mixer such as a Waring Blendor.

TABLE III

*Cements for coating fabrics, rubber and leather*

| | Example 1 | Example 2 | Example 3 | Example 4 |
|---|---|---|---|---|
| Chlorosulfonated polyethylene | 100 | 100 | | |
| Chlorosulfonated polyethylene (25% in toluene) | | | 400 | |
| Chlorosulfonated polyethylene (20% in toluene) | | | | 500 |
| Methyl ethyl ketone | 60.0 | 60.0 | | 75 |
| VM & P naphtha | 76.0 | 49.3 | | |
| Butyl alcohol | 50.0 | 50 | 100 | |
| Adipic acid | 2 | 2 | 2 | |
| Methanol | | | | 25 |
| Magnesium oxide | | 20 | | 20 |
| Tribasic lead maleate | 20 | | 20 | |
| Hydrogenated wood rosin | 2.5 | 2.5 | 5 | 2.5 |
| Precipitated calcium carbonate | | 20 | | 60 |
| VM & P naphtha | 80 | 80 | | 100 |
| Mercaptobenzothiazole | 2 | 2 | 2 | 2 |
| TiO$_2$ | 25 | 15 | 25 | 30 |
| Antimony trioxide | | | 10 | |
| Sodium acetate | | | | 0.1 |
| Percent solids | 36.3 | 40.3 | 29.1 | 26.4 |
| Viscosity at 25° C., Brookfield poises | 57.5 | | 45.0 | 5.2 |

Another feature of the invention involves the addition of agents to the above and like coating compositions, dispersions and cements that accelerate curing under the conditions that exist after the composition has been applied. In the event that the coating or film is held at or around room temperature and the curing of the hydrocarbon polymer is to take place at approximately that temperature, it is often desirable to shorten the curing time by superaccelerators added to speed up the curing. On the other hand, if the applied coating or film is to be subjected to higher temperatures, slower acting accelerators may be used if desired.

The curing systems that are used in the above coating compositions, dispersions and cements are generally those known to be satisfactory for the preparation of the solid halosulfonated hydrocarbon compounds. The recipes of the above patents are satisfactory although other suitable curing systems may be used. Various types of lead compounds may be used, such as litharge, basic lead carbonate and commercially named products containing such compositions as tribasic lead maleate, tribasic lead sulfate sold under various trade names. Magnesium oxide, polyoximes and the organic curing systems of the pending McAlevy U. S. application, S. N. 289,677, filed May 23, 1952 (now abandoned), may be used wherein the substituted polymers are cured by formation of sulfonamido groups with such compounds as the aliphatic and aromatic amides, amine, hydroxyl, and mercapto-containing compounds. Tribasic lead maleate is one of the preferred curing agents as it gives compositions that can be made in any color and the coating composition has good shelf-life while the films formed from such compositions have good weathering properties and are highly water insensitive. Litharge and the organic polyoximes, on the other hand, are used principally for compositions in which dark colors are desired. The quantity of the curing agents used in the coating compositions can be varied over a wide range, depending on the properties desired in the product. The preferred range for the lead compounds is between 20 and 40 parts per 100 parts of the hydrocarbon polymer, while for the organic cross-linking agents and the other inorganic compounds, 15 to 45 parts per 100 parts of the polymer are used.

In the absence of anti-gelling agents, the shelf-life of coating compositions containing uncured halosulfonated hydrocarbon polymers is relatively short. A gel begins to form in the unprotected compositions which results in what is believed to be at least a partial curing of the substituted polymer. Only a slight amount of curing is needed to cause the entire mass to gel.

Certain compounds prevent the formation of gels and are herein called anti-gelling agents. The monohydric aliphatic alcohols are especially effective for this purpose as are also certain organic acids. The alcohols that are used include methanol, ethanol, isopropanol, normal and isobutanol, normal octanol and higher aliphatic monohydric alcohols that are sufficiently soluble in the solvent used for the uncured hydrocarbon polymer. Butyl alcohol or isopropyl alcohol are preferred because of their high solubility in aromatic solvents and their relatively high boiling points. Unsaturated alcohols may likewise be used, such as allyl or methallyl alcohols but they are not desirable if odor is a factor. The organic acids suitable for use as anti-gelling agents include acetic, citric, phthalic, adipic, maleic and salicylic acids and anhydrides thereof. These acids and anhydrides per se inhibit gelling of the solutions but they do not prevent the solid films from being cured. While both alcohols and acids by themselves retard gelling, the combination of acid with alcohol gives a synergistic improvement, there being present from 50 to 100 parts of the alcohol per 100 parts of the hydrocarbon polymer and from 1 to 2 parts of acidic compound. The upper limit of the alcohol added is determined primarily by the solubility tolerance of the solution for that alcohol. No more alcohol should be employed than will dissolve in the hydrocarbon solvent. For methanol and ethanol, for example, in a toluene solution, no more than 5 parts per 100 parts of solution can be tolerated in a solution containing 20% of a chlorosulfonated polymer of ethylene. With the other alcohols specifically referred to above, as much as 20 parts per 100 parts of solution can be tolerated. The limits of the acidic compound that may be present as an anti-gelling agent range from 1 up to about 5 parts per 100 parts of the hydrocarbon polymer solution.

Any suitable solvent for the uncured hydrocarbon polymer may be used but the aromatic hydrocarbons falling in the boiling range between toluene and xylene are preferred because they give compositions which dry at approximately the proper rate and are comparatively non-toxic. If the coating composition is to be nonflammable, chlorinated hydrocarbons such as carbon tetrachloride and the other halogenated as well as halofluorinated hydrocarbons are used. The composition containing 20% of a chlorosulfonated polymer of ethylene in toluene is a preferred composition although solutions ranging up to 25% on the same basis can be employed. Such solutions of the halosulfonated polymers of ethylene have a high tolerance for alkyl substituted hydrocarbons so that pigmented dispersions in such hydrocarbons as naphtha and mineral spirits can be used. Esters such as isobutyl acetate, isopropyl acetate and methyl amyl acetate, and ketones such as methyl ethyl ketone, diisobutyl ketone and methyl isobutyl ketone, and alcohols such as n-butyl alcohol, isobutyl alcohol, and isopropyl alcohol can also be employed in pigmented dispersions.

Many of the known accelerators for curing halosulfonated elastomers may be employed such, for example, as mercaptobenzothiazole, benzothiazyl disulfide and the like. These and their equivalents are used in amounts ranging between 1 to 3 parts per 100 parts of the halosulfonated hydrocarbons, such accelerators being added to those compositions that are to be dried and the sulfonated hydrocarbon polymer content cured at temperatures between 125° C. and 160° C. Superaccelerators may likewise be employed, such, for example as DPG (diphenylguanidine), sodium acetate, pyridine and morpholine. These superaccelerators permit the preparation of coating compositions, paints, cements and the like that will cure at room temperatures. DPG is exceptionally well adapted for this use and should be present in amounts ranging from 0.1 to 2 parts per 100 parts of the hydrocarbon polymer solution. The other superaccelerators may likewise be employed in substantially the same proportions.

In addition to other adjuvants, such, for example, as fillers, coloring agents and dispersing agents, fire-proofing agents may be employed. Especially effective for the latter purpose is antimony trioxide. Antimony trioxide renders the chlorosulfonated hydrocarbon polymers fire-resistant when present to the extent of at least 10 parts of the trioxide per 100 parts of the chlorosulfonated polymer of ethylene or other hydrocarbon polymer when coated on flammable fabrics or fiber glass. By increasing the amount of antimony trioxide to about 50 parts per 100 parts of the hydrocarbon polymer, the fire resistance is increased to such an extent that an unsupported film of such a composition will not support combustion. Above 50 parts per 100 of the hydrocarbon polymer, the antimony trioxide appears to act merely as a filler. The preferred range, accordingly, is between 10 and 50 parts of the oxide per 100 parts of the hydrocarbon polymer for fire-resistant unsupported films.

Paints, lacquers, varnishes, cements and the like can be prepared in accord with the process of this invention to provide white, blue, black or any desired colored coating compositions. These compositions are particularly useful for the coating of a substrate which is subjected to flexing, such as fabrics, rubber, tire stock and the like. These coating compositions show good adhesion to fabrics and also to natural and synthetic elastomers, particularly if the latter are slightly buffed before being coated with the compositions herein described.

The coating compositions of this invention may be applied to any surface and the resulting film dried at room temperature or in an oven or other suitable device at a higher temperature. As has been indicated above, substantially no curing of the substituted polymer takes place until the solvent or dispersed phase, if a dispersion is used, has evaporated, or if an acid is used alone, the acid converted to a salt which does not appreciably retard gelation. In the event that curing of the substituted polymer is to take place at or about room temperature, it is preferable to have present in the coating composition a superaccelerator to speed up the curing although if time is not of the essence normal accelerators may be used, although with them considerably longer times are required to effect a cure. The coated films may be alternatively subjected to higher temperatures by radiation or from an oven to speed up the evaporation of the solvent or dispersed phase present and thereafter speed up the curing of the halosulfonated polymer.

The coating compositions likewise may be applied to the surface of cured natural or synthetic elastomers and the halosulfonated hydrocarbon polymer therein cured in the manner described above or, contrariwise, the coating composition may be applied to the uncured natural and synthetic elastomers such as rubber, neoprene, 1,3-butadiene-acrylonitrile, 1,3-butadiene-styrene and like polymeric or copolymeric compositions and the evaporation of the solvent and/or curing of the chlorosulfonated hydrocarbon polymers being accomplished simultaneously with the curing of the elastomers in a press, mold or similar device.

I claim:

1. A fluid composition comprising an uncured halosulfonated hydrocarbon polymer in an inert organic liquid taken from the group consisting of solvents for the polymer and non-solvents for the polymer which are capable of swelling the polymer, compounding agents for curing said polymer and at least one anti-gelling agent taken from the class consisting of monohydric aliphatic alcohols, acetic acid, citric acid, phthalic acid, adipic acid, maleic acid, salicylic acid and the anhydrides of said acids.

2. The composition of claim 1 wherein the anti-gelling agent is a monohydric aliphatic alcohol.

3. The composition of claim 1 wherein the anti-gelling agent is an organic acid selected from the group consisting of acetic acid, citric acid, phthalic acid, adipic acid, maleic acid, and salicylic acid.

4. The composition of claim 1 wherein the anti-gelling agent is the anhydride of an organic acid selected from the group consisting of acetic acid, citric acid, phthalic acid, adipic acid, maleic acid, and salicylic acid.

5. The composition of claim 1 wherein the anti-gelling agent is a mixture of a monohydric aliphatic alcohol and an organic acid selected from the group consisting of acetic acid, citric acid, phthalic acid, adipic acid, maleic acid, and salicylic acid.

References Cited in the file of this patent

UNITED STATES PATENTS 2,618,574    Pavlic ------------------ Nov. 18, 1952

OTHER REFERENCES

Du Pont Information Bulletin "Hypalon" S–2, Chlorosulfonated Polythene, No. X–34, published Apr. 15, 1952, pages 3–4.